US012674996B2

(12) United States Patent
Milster et al.

(10) Patent No.: US 12,674,996 B2
(45) Date of Patent: Jul. 7, 2026

(54) DEVICES AND METHODS FOR PERFORMING HIGH-HARMONIC DIFFRACTIVE LENS COLOR COMPENSATION

(71) Applicant: Arizona Board of Regents on Behalf of the University of Arizona, Tucson, AZ (US)

(72) Inventors: Thomas D. Milster, Tucson, AZ (US); Young-Sik Kim, Tucson, AZ (US); Zichan Wang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 226 days.

(21) Appl. No.: 18/276,105

(22) PCT Filed: Feb. 5, 2022

(86) PCT No.: PCT/US2022/070544
§ 371 (c)(1),
(2) Date: Aug. 7, 2023

(87) PCT Pub. No.: WO2022/170355
PCT Pub. Date: Aug. 11, 2022

(65) Prior Publication Data
US 2024/0142790 A1 May 2, 2024

Related U.S. Application Data

(60) Provisional application No. 63/146,132, filed on Feb. 5, 2021.

(51) Int. Cl.
| | |
|---|---|
| *G02B 27/42* | (2006.01) |
| *G02B 5/18* | (2006.01) |
| *G02B 27/00* | (2006.01) |

(52) U.S. Cl.
CPC ........ *G02B 27/4211* (2013.01); *G02B 5/1876* (2013.01); *G02B 27/0056* (2013.01)

(58) Field of Classification Search
CPC ...... G02B 5/18; G02B 5/1876; G02B 5/1866; G02B 5/1857; G02B 5/1814; G02B 27/00;
(Continued)

(56) References Cited

U.S. PATENT DOCUMENTS

| | | | | |
|---|---|---|---|---|
| 5,317,349 | A | * | 5/1994 | Vanderwerf ......... G03B 21/132 |
| | | | | 353/38 |
| 2019/0049752 | A1 | | 2/2019 | Van Heugten et al. |
| 2019/0142577 | A1 | | 5/2019 | Xie |

FOREIGN PATENT DOCUMENTS

WO        2006091181  A1      8/2006

OTHER PUBLICATIONS

International Search Report for PCT/US22/70544 mailed Apr. 27, 2022.

* cited by examiner

*Primary Examiner* — Jie Lei
(74) *Attorney, Agent, or Firm* — Thomas I Horstemeyer, LLP

(57) ABSTRACT

Devices and methods are provided for performing color correction of focal dispersion in high-harmonic lenses. The device comprises a multi-order diffractive engineered surface (MODE) lens comprising a MODE primary lens having height transitions in the front surface that segment it into annular zones and a color corrector comprising a diffractive Fresnel lens (DFL). Polychromatic light passing through the MODE primary lens experiences LCA that is corrected by the color corrector. The color corrector can be configured to correct Type 1 LCA resulting from a combined effect of the DFL and a refractive index change versus wavelength asso- (Continued)

ciated with material comprising the device that together produce a change in focus of the polychromatic light, as well as Type 2 LCA resulting from a cyclic variation in focal length versus wavelength caused by the abrupt changes in the height of the front surface of the MODE primary lens at the transitions.

19 Claims, 13 Drawing Sheets

(58) Field of Classification Search
CPC ................ G02B 27/42; G02B 27/4211; G02B 27/4216; G02B 27/0056; G02B 27/4272; G02B 3/00; G02B 3/10; G02B 3/0081; G02B 3/0087; G02B 7/06; G02B 2003/0093; G02C 7/04; G02C 2202/20
USPC ....... 359/558, 566, 565, 569, 570–272, 574, 359/575, 563, 457, 742
See application file for complete search history.

Table 1. Optical Design A of the color corrector without the AZTECC lens details.

| Surface number | Radius of curvature (mm) | Thickness (mm) | material | Element |
|---|---|---|---|---|
| 1 | 23.867 | 16 | N-BK7 | Field lens |
| 2 | -11.417 | 12 | SF5 | |
| 3 | 165.877 | 6.155 | Air | |
| 4 | Infinity | 15 | S-BSL7 | Doublet A |
| 5 | -49.303 | 15 | S-TIH53 | |
| 6 | -127.514 | 17 | Air | |
| 7 | -318.183 | 15 | S-BSL7 | Doublet B |
| 8 | -85.966 | 15 | S-LAL8 | |
| 9 | -91.606 | 2 | Air | |
| 10 | Infinity | 14 | L-BSL7 | AZTECC |
| 11 | Infinity | 2 | Air | |
| 12 | Infinity | 3 | N-BK7 | DFL |
| 13 | DFL | 10 | Air | |
| 14 | 91.606 | 15 | S-LAL8 | Doublet C |
| 15 | 85.966 | 15 | S-BSL7 | |
| 16 | 318.183 | 3.320 | Air | |
| 17 | 127.514 | 12 | S-TIH53 | Doublet D |
| 18 | 49.303 | 16 | S-BSL7 | |
| 19 | Infinity | 179.731 | Air | |

FIG. 6

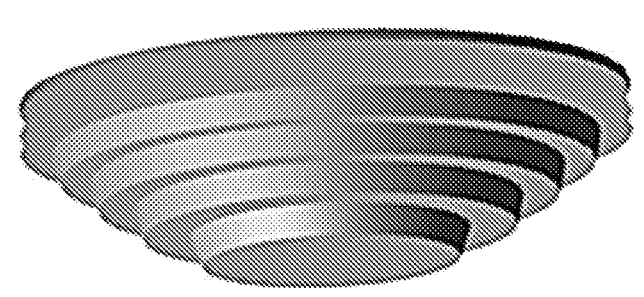
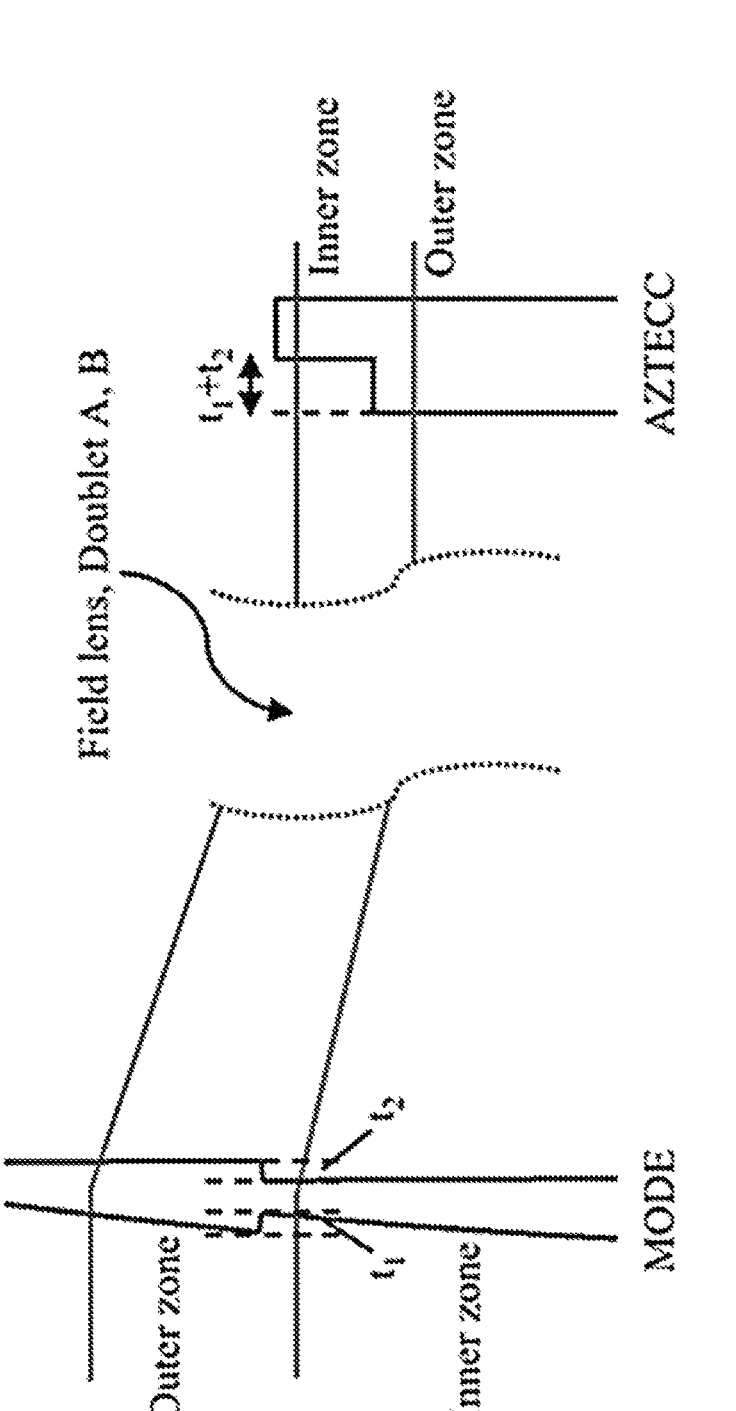
FIG. 10B
FIG. 10A

On axis 0.125°

Airy dimeter = 6.7 μm 589 nm
658 nm
727 nm

DEVICES AND METHODS FOR PERFORMING HIGH-HARMONIC DIFFRACTIVE LENS COLOR COMPENSATION

CROSS REFERENCE TO RELATED APPLICATIONS

This application is the 35 U.S.C. § 371 national stage application of PCT Application No. PCT/US2022/070544, filed January Feb. 5, 2022, which claims priority to, and the benefit of, U.S. provisional application entitled "DEVICES AND METHODS FOR PERFORMING HIGH-HARMONIC DIFFRACTIVE LENS COLOR COMPENSATION", having Ser. No. 63/146,132, filed Feb. 5, 2021, which are hereby incorporated by reference herein in their entireties.

TECHNICAL FIELD

The present disclosure is directed to high-harmonic diffractive lens color compensation, and more particularly, to a multiple-order diffraction engineered (MODE) lens and method for performing high-harmonic diffractive lens color compensation.

BACKGROUND

Multiple-harmonic optical elements have interesting and useful optical properties, and they can also be used for lightweight optical components in future space telescopes, THz imaging, beam shaping, remote sensing, and other applications. The optical principle behind all these systems is to design the focal spot of the diffractive lens into a higher diffractive order, rather than the first diffractive order that is common to single-order diffractive Fresnel lenses (DFLs). Like DFLs, multiple-harmonic systems display a dramatic change in focal position with wavelength. However, the axial range of focus $\Delta f$ is limited to approximately $f_0/M$, where M is the focal diffraction order at the design wavelength.

Correction of the focal change with wavelength, otherwise known as focal dispersion or longitudinal chromatic aberration (LCA), for diffractive optical systems is an important topic, given that the focal change is inversely proportional to wavelength, where $$f(\lambda) = f_0 \frac{\lambda_0}{\lambda}, \tag{1}$$

and $\lambda_0$ is the design wavelength and $\lambda$ is the evaluation wavelength. For a system that images objects in the visible spectrum (400 nm to 700 nm) with a center wavelength of 550 nm, a DFL with M=1 exhibits >50% change in focus. The resulting image blur creates unacceptable images without correction. High-harmonic lens systems have considerably less focal dispersion. For example, an M=250 system used for the visible spectrum exhibits only a 0.4% change in focus and is apochromatic in the sense that there are multiple wavelengths $\lambda_p$ that focus to $f_0$ given by $$\lambda_p = M\lambda_0/p, \tag{2}$$

where p is an integer, the residual focal dispersion $\Delta f$ is much larger than is characteristic of classical apochromatic lenses.

Since high-harmonic diffractive lenses and DFLs are ultralightweight, they are attractive for use as large-aperture primary lenses in space telescopes. However, the focal dispersion should be corrected for high-quality imaging. A secondary optical system, placed near the focus of the primary lens, is acceptable for spacecraft, if the volume and mass is not large. Although Schuppman-type color correctors have been discussed for large-aperture space-telescope DFL systems, they are undesirable in telescopes with low f-number primary objective lenses, due to the requirement of refocusing a virtual image with large marginal ray angles. In addition, the Schupmann configuration by itself is not enough to compensate the unique diffractive effects observed in M>1 systems.

A need exists for a device and method for performing color correction to correct focal dispersion in high-harmonic lenses.

SUMMARY

The present disclosure presents a device and method for correcting longitudinal chromatic aberration (LCA) in high-harmonic diffractive lenses. In one aspect, a device comprises a multi-order diffractive engineered surface (MODE) lens comprising a MODE primary lens and a color corrector. Polychromatic light is incident on and passes through the MODE primary lens before being incident on and passing through the color corrector. The polychromatic light passing through the MODE primary lens experiences LCA that is corrected by the color corrector.

In accordance with one or more aspects, the MODE primary lens comprises a curved front surface having an M-order diffractive pattern formed therein that extends from a center of the MODE primary lens to a periphery of the MODE primary lens, where M is a positive integer that is greater than or equal to 250. The M-order diffractive pattern can segment the MODE primary lens into N MOD zones, each MOD zone being separated from an adjacent MOD zone by a transition in the curved front surface having a preselected transition height.

In accordance with various aspects, the color corrector can comprise a diffractive Fresnel lens (DFL).

In accordance with one or more aspects, the color corrector can further comprise a field lens, a doublet relay lens and an Arizona total energy color corrector (AZTECC) lens. The field lens can be disposed at or near a focal point associated with an effective focal length (EFL) of the MODE primary lens. The field lens can be optically aligned with the MODE primary lens and with the DFL. The doublet relay lens can be optically aligned with the field lens and with the DFL. The AZTECC lens can be optically aligned with the doublet relay lens and the DFL.

In accordance with various aspects, the doublet relay lens can comprise a first pair of doublets A and B and a second pair of doublets C and D, the first pair of doublets A and B being disposed in between the field lens and the AZTECC lens, the second pair of doublets C and D being disposed in between the DFL and an output of the color corrector. The DFL can be disposed in between the AZTECC lens and the second pair of doublets C and D. The AZTECC lens can be disposed in between the first pair of doublets A and B and the DFL.

In accordance with one or more aspects, the first pair of doublets A and B can collimate light coupled by the field lens onto the first pair of doublets and can couple a collimated light beam onto the AZTECC lens. The second pair of doublets can refocus the collimated light beam passing through the AZTECC lens and the DFL.

In accordance with various aspects, the color corrector can correct for Type 1 LCA and Type 2 LCA, where Type 1 LCA being LCA can result from a combined effect of a refractive index change versus wavelength associated with material comprising the device and the DFL producing a change in focus of the polychromatic light, and where Type 2 LCA can be LCA resulting from a cyclic variation in focal length versus wavelength resulting from abrupt changes in the height of the front surface of the MODE primary lens due to the transitions.

In accordance with one or more aspects, the AZTECC lens can comprise a Type 2 LCA corrector plate having multiple plate zones with multiple respective thicknesses such that each plate zone produces a preselected number of wavelengths of optical path difference (OPD) as the collimated light passes through the AZTECC lens.

In another aspect, a method comprises receiving polychromatic light incident on a MODE primary lens, where the polychromatic light passing through the MODE primary lens experiences LCA before emission; and receiving the emitted polychromatic light incident on a color corrector, where the color corrector corrects the LCA before emission. The method can comprise directing the polychromatic light onto the MODE primary lens. The MODE primary lens can comprise a curved front surface having an M-order diffractive pattern formed therein that extends from a center of the MODE primary lens to a periphery of the MODE primary lens, where M is a positive integer that is greater than or equal to 250, the M-order diffractive pattern segmenting the MODE primary lens into N MOD zones, each MOD zone being separated from an adjacent MOD zone by a transition in the curved front surface having a preselected transition height.

In accordance with various aspects, the color corrector can comprise a diffractive Fresnel lens (DFL). The color corrector can comprise a field lens, the color corrector positioned with the field lens disposed at or near a focal point associated with an effective focal length (EFL) of the MODE primary lens, the field lens being optically aligned with the MODE primary lens and with the DFL. The method can comprise collimating light coupled by the field lens onto a pair of doublets A and B of the color corrector to produce a collimated light beam, the collimated light beam coupled onto an Arizona total energy color corrector (AZTECC) lens. The color corrector can comprise a doublet relay lens comprising the pair of doublets A and B, the doublet relay lens A and B optically aligned with the field lens and with the DFL, and the AZTECC lens optically aligned with the doublet relay lens and the DFL. The doublet relay lens can comprise another pair of doublets C and D, the pair of doublets A and B being disposed in between the field lens and the AZTECC lens, the other pair of doublets C and D being disposed in between the DFL and an output of the color corrector, the DFL being disposed in between the AZTECC lens and the second pair of doublets C and D, the AZTECC lens being disposed in between the first pair of doublets A and B and the DFL. The other pair of doublets C and D can refocus the collimated light beam passing through the AZTECC lens and the DFL.

In accordance with one or more aspects, the AZTECC lens can comprise a Type 2 LCA corrector plate having multiple plate zones with multiple respective thicknesses such that each plate zone produces a preselected number of wavelengths of optical path difference (OPD) as the collimated light passes through the AZTECC lens. The color corrector can correct for Type 1 LCA and Type 2 LCA, Type 1 LCA being LCA resulting from a combined effect of a refractive index change versus wavelength associated with material comprising the device and the DFL producing a change in focus of the polychromatic light, Type 2 LCA being LCA resulting from a cyclic variation in focal length versus wavelength resulting from abrupt changes in the height of the front surface of the MODE primary lens due to the transitions.

These and other systems, methods, features, and advantages of the present disclosure will be or become apparent to one with skill in the art upon examination of the following description, drawings and claims. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 2 also shows the color corrector system in magnified view in FIG. 2 to show that the color corrector has several parts, including a field lens, four doublets, a DFL and a new type of component that is referred to herein as an Arizona total energy color corrector (AZTECC) lens.

FIG. 3A shows a known color correction structure adapted by Eyeglass; FIG. 3B is a schematic diagram that shows the Schupmann-type color correction condition, where a portion of the optical system is illustrated with axial intercepts $i_l$ and $i_s$ foci from the primary lens, $f_l$ and $f_s$ front focal lane positions of HOE 2, and the virtual image locations of light transmitted through HOE 2, where subscripts l and s refer to long and short wavelengths of the design spectrum, respectively.

FIG. 6 shows a table that FIG. 6 lists the optical design parameters associated with an embodiment of the color corrector shown in FIG. 7.

FIG. 10A shows the generation and compensation of abrupt OPD changes between MODE zones; optical elements between the MODE primary lens and the AZTECC Type 2 LCA corrector, as well as elements after the AZTECC, are not presented for the sake of simplicity.

FIG. 10B shows a CAD model of the AZTECC element used in the MODE system in accordance with a representative embodiment.

FIG. 12A is a spot diagram for the MODE primary lens only, on-axis; FIG. 12B is a spot diagram for the MODE primary lens only, full field; FIG. 12C is a spot diagram for the MODE primary lens with color corrector, on axis; and FIG. 12d is a spot diagram for the MODE primary lens with color corrector, full field.

DETAILED DESCRIPTION

Figure 1:
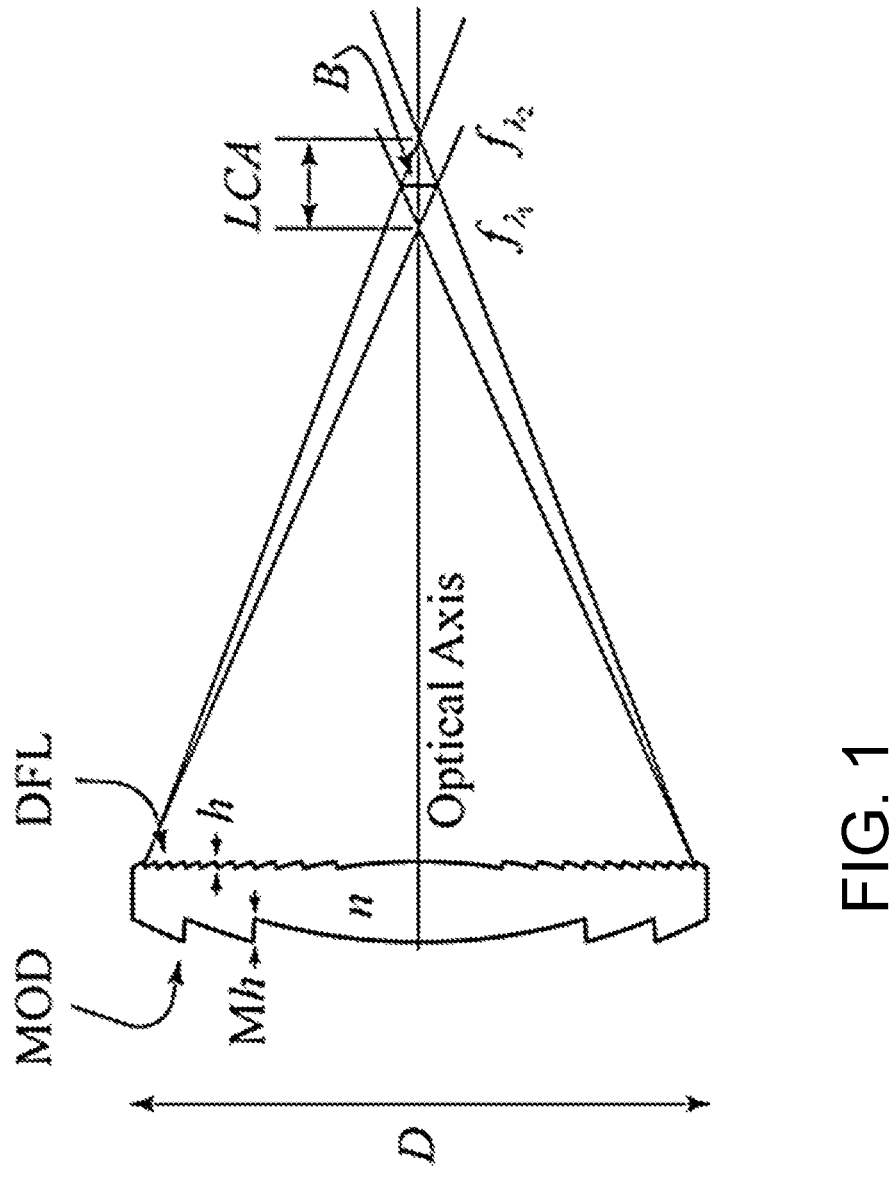
FIG. 1 is a side view of the MODE lens in accordance with a representative embodiment having a front surface that comprises a MOD lens and having a back surface that comprises a DFL; the MOD surface has a high M number (M>250) to produce a small value for the diffractive component of the LCA.

The present disclosure is directed to a new type of device and method for correction of LCA in high-harmonic lenses. The device comprises a multi-order diffractive engineered surface (MODE) lens comprising a MODE primary lens having height transitions in the front surface that segment it into annular zones and a color corrector comprising a diffractive Fresnel lens (DFL). Polychromatic light passing through the MODE primary lens experiences LCA that is corrected by the color corrector. The color corrector can be configured to correct Type 1 LCA resulting from a combined effect of the DFL and a refractive index change versus wavelength associated with material comprising the device that together produce a change in focus of the polychromatic light, as well as Type 2 LCA resulting from a cyclic variation in focal length versus wavelength caused by the abrupt changes in the height of the front surface of the MODE primary lens at the transitions.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. Any defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The terms "approximately" or "about" mean to within an acceptable limit or amount to one of ordinary skill in the art.

Relative terms, such as "in," "out," "over," "above," "below," "top," "bottom," "upper," "lower," for example, may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

The present disclosure introduces a new type of device and method for performing color correction that corrects the focal dispersion in high-harmonic lenses. In accordance with a representative embodiment, the device is a MODE lens that combines a multi-order diffractive (MOD) surface with a single order diffractive Fresnel lens (DFL), as shown in FIG. 1. FIG. 1 is a side view of the MODE lens in accordance with a representative embodiment having a front surface that comprises a MOD lens and having a back surface that comprises a DFL. The MOD surface has a high M number (M>250) to produce a small value for the diffractive component of the LCA. The DFL reduces the refractive part of the total focal dispersion, making each MOD zone achromatic. The MOD surface comprises annular zones with transition heights of Mh, where h is the glass thickness of index n that produces one wave of optical path difference (OPD) in transmission.

The LCA comprises two components, namely, type 1 LCA that is due to the dispersion of the glass and the DFL and Type 2 LCA that is due to diffractive characteristics of the MOD surface. Over a wide spectral range, Type 1 LCA exceeds Type 2 LCA. The DFL on the back surface is designed to partially compensate for refractive dispersion. However, the zonal MODE DFLs are optimized individually. Each MOD zone is achromatic in the classical sense, where two wavelengths in the spectrum focus at $f_0$. Previous results with an M=1000 MODE lens indicate that the residual Type 1 $\Delta f$ is approximately equal to the secondary spectrum of the Type 1 LCA component. A second design example with an M=1000 MODE lens shows a similar characteristic. Even with this achromatic compensation, the polychromatic imaging performance leads to a Strehl ratio of only 0.21 in the best design over the astronomical R-band of wavelengths (589 nm to 727 nm). One of the goals discussed below is to increase the polychromatic Strehl ratio to near diffraction-limited performance.

Figure 2:
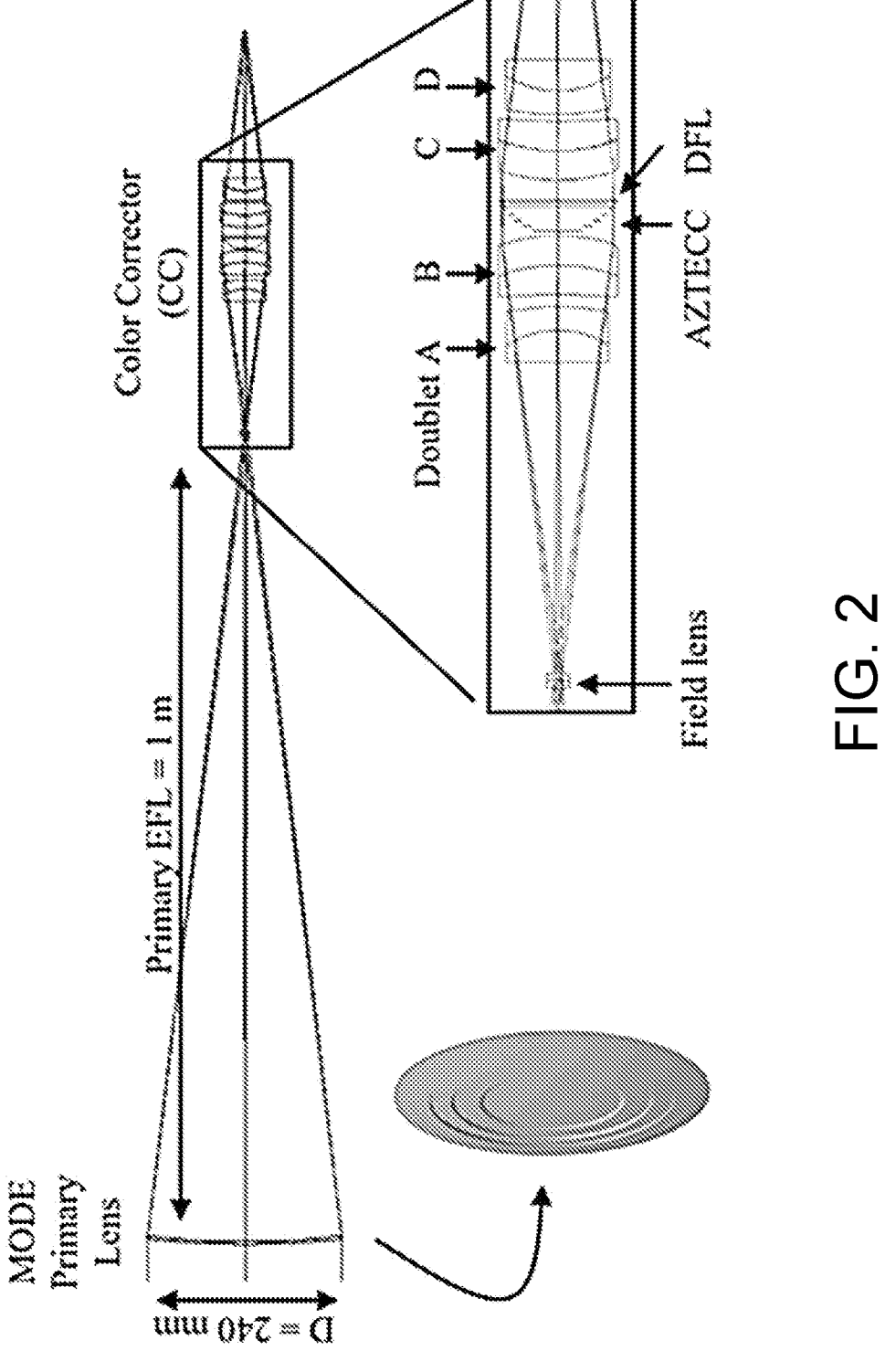
FIG. 2 shows the layout of the color-corrected telescope system in accordance with an embodiment in which the color-corrected telescope system comprises a 240 mm diameter aperture MODE primary lens with effective focal length (EFL) of 1 m and a color corrector (CC) system near the focus of the primary lens.

FIG. 2 shows the layout of the color-corrected telescope system in accordance with an embodiment. In accordance with this embodiment, the color-corrected telescope system comprises a 240 mm diameter aperture MODE primary lens with effective focal length (EFL) of 1 m and a color corrector (CC) system near the focus of the primary lens. FIG. 2 also shows the color corrector system in magnified view in FIG. 2 to show that the color corrector has several parts, including a field lens, four doublets, a DFL and a new type of component that is referred to herein as an Arizona total energy color corrector (AZTECC) lens. The primary MODE lens has five zones with M=2196 and is designed over the astronomical R-band of wavelengths. The field lens is an essential part of the system to reduce the height of off-axis rays and enables effective color correction over the entire 0.25° full field of view. The main part of the color corrector is essentially a four-doublet relay lens that refocuses the light and significantly reduces chromatic aberrations. The DFL adds dispersive power to the four-doublet relay to form classical apochromatic correction of the LCA, and the AZTECC lens corrects the diffractive component of the LCA. In this system, the color corrector is designed with near unity magnification, although it can have non-unity magnification in some embodiments.

The present disclosure is divided into several sections. In Section 1, additional background is presented with discussion of existing solutions to reduce chromatic aberrations of transmissive telescopes, as well as a brief description of aberrations specific for our MODE system. In Section 2, design theories that include the principles of MODE dispersion and methodology of eliminating MODE dispersion are introduced in detail. Section 3 presents design strategies and outcome of the 240 mm diameter MODE telescope shown in FIG. 2. Lastly, Section 4 and 5 present a short discussion about the color corrected MODE system of the present disclosure and the conclusions, respectively.

1. Additional Background Discussion

Previously, large-aperture DFL Eyeglass and MOIRE telescope designs addressed the issue of color correction for very large aperture space telescopes using Schupmann-type color correctors. LCA of the primary lens is proportional to the EFL of the primary in these designs. Without correction, the LCA due to the Eyeglass 2500 m EFL primary lens is ~200 m over the spectral range 0.48 μm to 0.52 μm. The corresponding MOIRE LCA due to a 32.5 m EFL primary is ~2.3 m over the spectral range from 625 nm to 670 nm. Principles of color correction for these systems are discussed below.

Figure 3B:
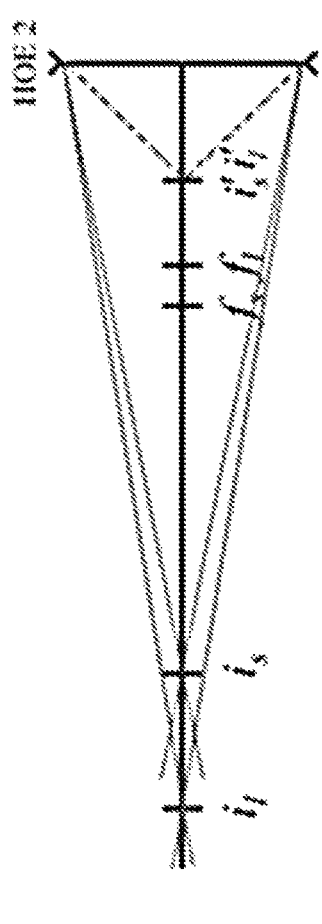
FIGS. 3A and 3B show simplified illustrations of modified Schupmann configurations used to correct single-harmonic DFL dispersion of a primary lens in a telescope.
Figure 3A:
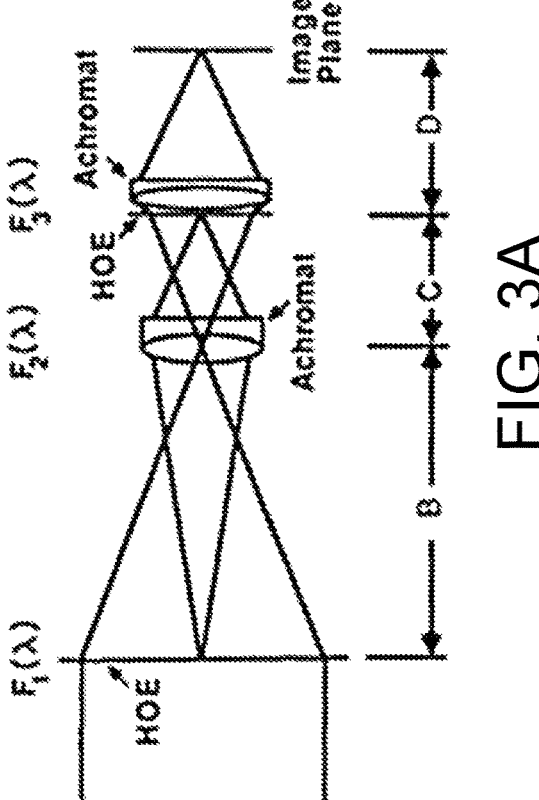

FIGS. 3A and 3B show simplified illustrations of modified Schupmann configurations used to correct single-harmonic DFL dispersion of a primary lens in a telescope. FIG. 3A shows a known color correction structure adapted by Eyeglass. FIG. 3B is a schematic diagram that shows the Schupmann-type color correction condition, where a portion of the optical system is illustrated with axial intercepts $i_l$ and $i_s$ foci from the primary lens, $f_l$ and $f_s$ front focal lane positions of HOE 2, and the virtual image locations of light transmitted through HOE 2. Subscripts l and s refer to long and short wavelengths of the design spectrum, respectively.

The Eyeglass conceptual telescope design shown in FIG. 3B is shown in FIG. 3A with an object at infinity. A long-wavelength point image and a short-wavelength point image formed by the primary HOE due to a distant object are shown as ii and is, respectively, where the primary HOE focal dispersion displaces the longer wavelength image closer to the primary. The negative-power second HOE 2 exhibits long-wavelength and short-wavelength focal lengths $f_l$ and $f_s$, respectively. The focal length and axial position of HOE 2 are chosen so that the virtual images of both wavelengths, $i_l'$ and $i_s'$, are coincident and arranged with equal transverse magnification for both wavelengths. The highly divergent light from HOE 2 is then focused to the image plane by the second achromat, which is not shown in FIG. 3B. By including realistic refractive index values, it has been shown that the ideal system is apochromatic with three wavelengths that focus at the image plane. Residual LCA is ~40 μm over a spectral band from 400 nm to 700 nm. The MOIRE color corrector is a similar concept, except the relay lens is replaced by a collimator.

Single-harmonic DFL telescope primary lenses corrected by Schupmann-like structures share several common problems that make them unsuitable for large aperture, wide field-of-view applications. A 240 mm diameter, 1 m focal length, F/4 DFL primary lens, the first-order parameters of which are the same as the high-harmonic design shown in later sections, is used as an example to demonstrate these issues. The primary-lens DFL exhibits 212 mm of LCA over the astronomical R-band without color correction. The example system in accordance with the inventive principles and concepts is corrected with a geometry similar to the one shown in FIG. 3A, with the first achromat replaced by an ideal field lens for simplicity. Since the second achromat only serves to reimage the virtual focus and does not contribute significantly to color correction, it is not included in the example system.

Figure 4B:
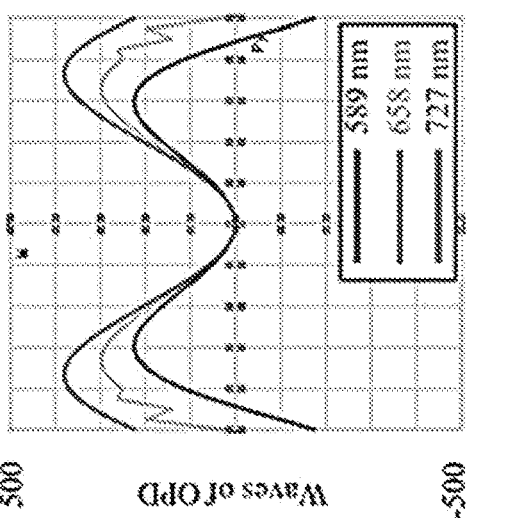
FIG. 4B shows an OPD aberration plot of the output of the system shown in FIG. 4A, which demonstrates that when the aperture of the primary DFL is large, spherochromatism cannot be corrected and results in unacceptable performance.
Figure 4A:
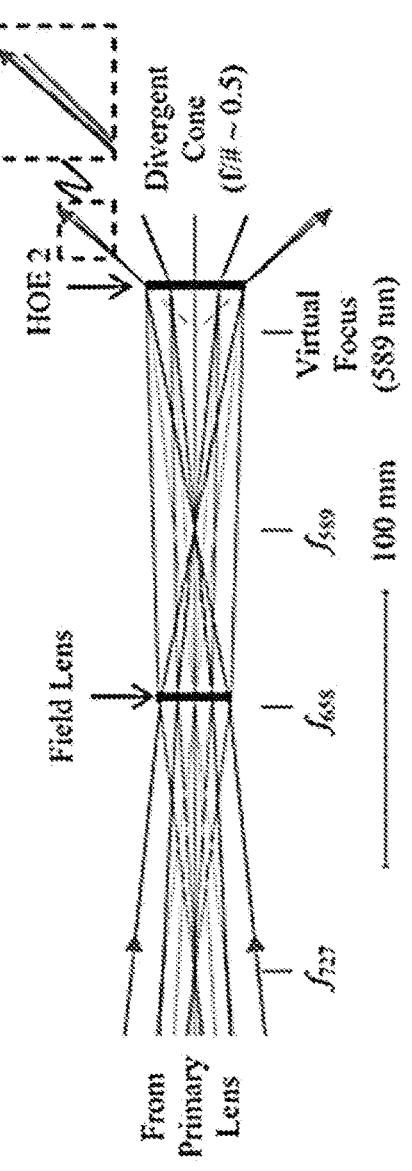
FIG. 4A shows a raytrace of a DFL telescope system with a Schupmann-type color corrector.

FIG. 4A shows a raytrace of a DFL telescope system with a Schupmann-type color corrector. FIG. 4B shows an OPD aberration plot of the output of the system shown in FIG. 4A, which demonstrates that when the aperture of the primary DFL is large, spherochromatism cannot be corrected and results in unacceptable performance. As shown in FIG. 4A, the color-corrected output has an f-number of approximately 0.5, which makes design of the second achromat impractical when constrained by implementing a color corrector system that is lightweight compared to the primary lens. In addition, when the aperture of the primary DFL is moderately large, spherochromatism, which is variation in the fourth-order shape of the OPD versus wavelength as measured in the exit pupil, becomes dominant over LCA, as shown in the OPD plot of FIG. 4B. Spherochromatism affects rays diverging from the virtual focus by slightly changing ray angles for different wavelengths as a function of radius in the divergent cone, as shown with the inset of FIG. 4A. Adding aspheric terms to either the primary or HOE 2 does not significantly improve performance. Also, fabrication of HOE 2 is problematic, due to its low f-number. For example, the outermost period of the diffractive pattern for a DFL with f/#=0.5 at 658 nm is ~0.7 μm.

To realize larger-aperture and low f-number ultralightweight astronomical telescopes, a different solution is necessary. As shown in the following sections, the MODE lens with a new type of color corrector satisfies the goal of providing diffraction-limited imaging quality with an ultralight transmissive optical system. Although computer processing techniques show good promise for enhancing highharmonic and wide-bandwidth images, they are not discussed herein.

2. Design Theory

This section presents the basic theory of color correction for high-harmonic MODE lenses in accordance with the inventive principles and concepts of the present disclosure, and it may be useful for other high-harmonic designs. The glass refractive index change versus wavelength and the back-surface DFL produce a change in focus as a function of wavelength that is called Type 1 LCA. In effect, each MODE zone is optimized to be achromatic, where two wavelengths come to focus at the same axial location, by combination of the zonal refractive lens and the zonal DFL. Correction of Type 1 LCA is similar to classical color correction, with the added constraint of a reduced diameter for the correction optics. Unlike the slowly varying Type 1 LCA, the MODE lens also exhibits a cyclic variation in focal length versus wavelength, where the range of focal values in each cycle is $\Delta f \sim f/M$, and the cycle period is $\Delta\lambda \sim \lambda_0/M$ and $\lambda_0$ is the design wavelength. This cyclic variation is Type 2 LCA. This cyclic variation is due to the MOD front surface. Type 1 LCA and Type 2 LCA are additive. The design theory is divided into first solving the Type 1 LCA problem, and then solving the Type 2 LCA problem. A discussion about a new effect called zonal confusion is also included that is a consequence of Type 2 LCA correction.

2.1 Type 1 LCA

To understand the principle of correcting Type 1 LCA, it is necessary to examine a simplified optical system by considering only paraxial properties and axial color. The task is to correct the LCA of an achromatic lens to make it apochromatic. It is not possible add lenses at the primary because of weight/mass considerations for space telescopes. The Schupmann configuration is also not desirable, because it results in virtual focal point with low f-number that must be refocused onto the image plane. The selected method to correct the axial color is to use a relay lens at the focal point of the primary lens and then re-image it onto the image plane.

Figure 5:
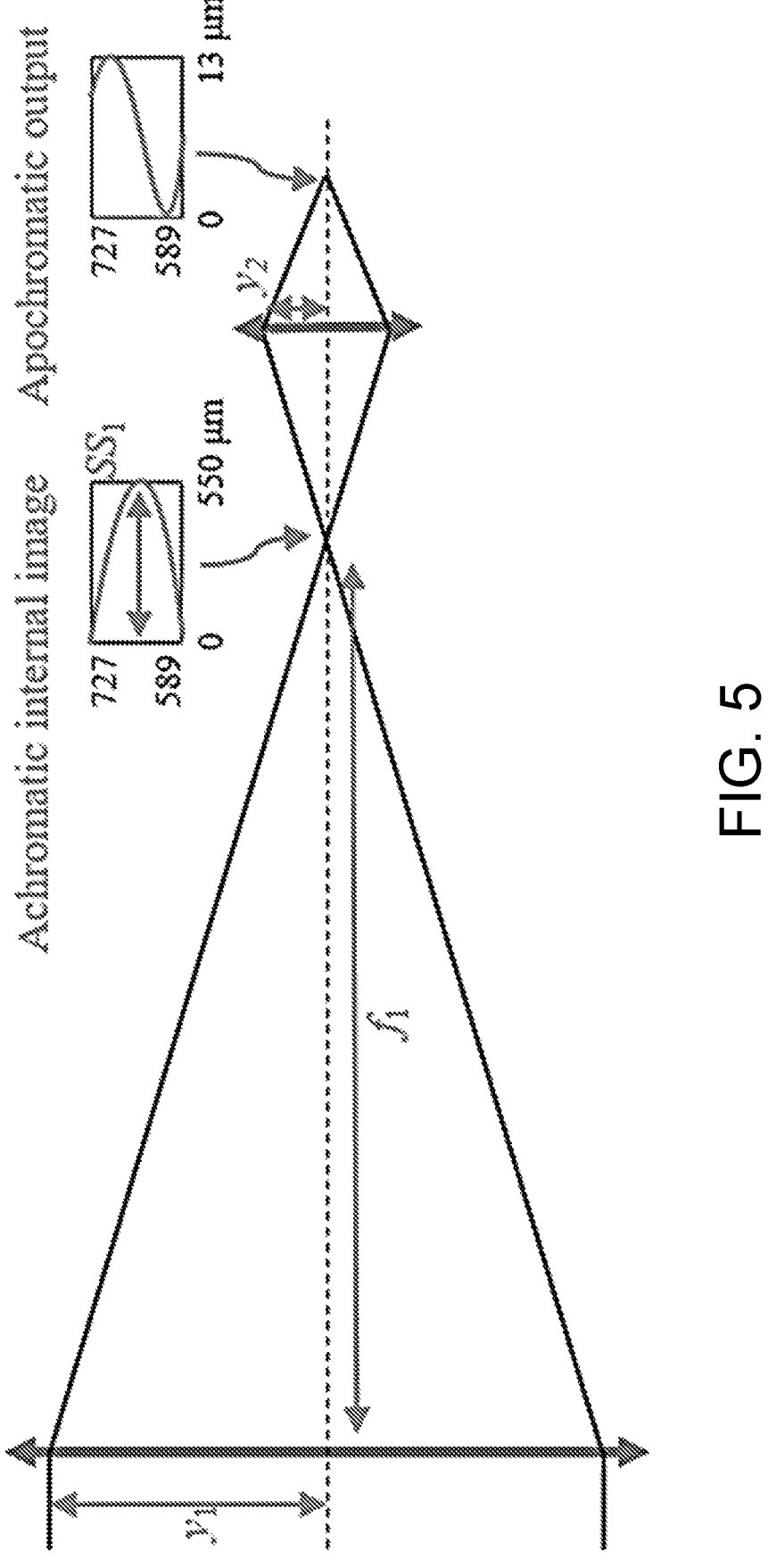
FIG. 5 is a schematic diagram of a Type 1 LCA color correcting structure used in the MODE system in accordance with a representative embodiment.

FIG. 5 is a schematic diagram of a Type 1 LCA color correcting structure used in the MODE system in accordance with a representative embodiment. One goal of the color corrector is to correct $SS_1$ and make the output apochromatic, as shown in insets, which show LCAs before and after correction. In both insets, the horizontal axis is LCA in micrometers and the vertical axis is wavelength in nanometer. As shown in FIG. 5, Type 1 LCA at the primary-lens focal point $f_1$ exhibits an achromatic form, and the focal point difference between the central wavelength focus and shortest and longest wavelength foci is the secondary spectrum of the primary lens $(SS_1)$. The color corrector is a finite-conjugate relay lens, where the object distance is a function of wavelength. Ideally, the output image location created by the relay does not vary as a function of wavelength. Therefore, the secondary spectrum of the color corrector $(SS_2)$ should be opposite in sign compared to $SS_1$. As shown in FIG. 5, $SS_1$ is achromatic with total focal range of about 550 micrometers. To achieve apochromatic output at the image plane, $SS_2$ must satisfy the relationship $$\frac{f_1}{f_2} = -\frac{SS_1}{SS_2}\frac{y_1^2}{y_2^2}, \tag{1}$$

where $f_1$ and $f_2$ are focal lengths of the first and second lenses, respectively, and $y_1$ and $y_2$ are marginal ray heights at principal planes of the lenses.

One important task of this design is reducing the size of the color corrector, which is the second lens in FIG. 5. A short color-corrector focal length $f_2$ is desirable to lower $y_2$, which requires large $SS_2$ to satisfy Eq (3). For example, if $f_1$=1 m, $f_2$=112 mm, $y_1$=120 mm, $y_2$=40 mm, and $SS_1$=0.55 mm, $SS_2$=−2.22 mm, which is extremely difficult to produce in a compact space with only refractive elements. To provide the large dispersion for $SS_2$, a DFL is used in combination with refractive doublets in this embodiment. Reduction of the color corrector diameter is accomplished by redirecting the marginal ray through distributing optical power of the color corrector. The solution shown in FIG. 7, which is the color corrector design without the AZTECC lens, is a first group of elements to collimate the light from field lens (A and B) and second group of elements to refocus the beam (C and D). This system provides a collimated space between B and C, and the principal plane is usually within or close to it. This collimated space provides additional advantage for diffractive optics placing diffractive optical elements, including the DFL for Type 1 correction and the AZTECC lens for Type 2 correction, as explained in the next section. Table 1 shown in FIG. 6 lists the optical design parameters associated with FIG. 7.

Figure 7:
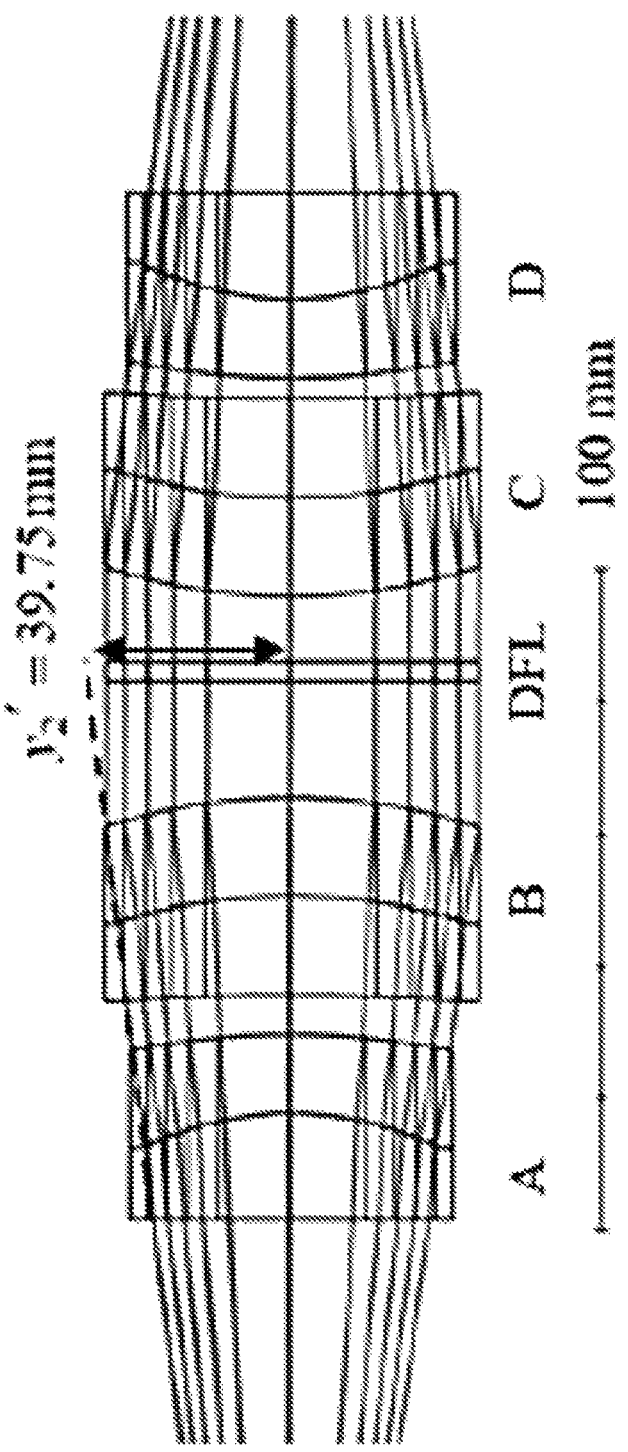
FIG. 7 shows the color corrector having the parameters listed in Table 1, but without the AZTECC lens for ease of illustration.

FIG. 7 shows the color corrector having the parameters listed in Table 1, but without the AZTECC lens for ease of illustration. Extension of the marginal ray is shown to the principal plane in order to illustrate the difference between the effective radius $y_2$ in Eq. (3) and the and physical radii of the lenses. The design shown in FIG. 7 is nearly symmetric, with doublets A and D and doublets B and C having the same prescriptions, but doublets C and D are reversed in the converging cone. Spacings between the doublets are optimized for optical performance, as discussed in the next section. Simple spherical-surface doublets are used in this example, due to their well-known properties for ease of fabrication, spherical aberration, and control of coma. In this example, doublets A and D provide almost no optical power, but they are very dispersive. In this example, doublets B and C provide the great majority of the optical power to collimate and then refocus the light cone. Since $SS_1$ is very large and an even larger $SS_2$ is required with a small-diameter color corrector, the amount of dispersion required from the positive doublets is also very large. In order to form the required achromatic behavior from the color corrector, it is very difficult to form both positive and negative dispersion from only refractive elements. Addition of the DFL allows one-sided dispersion from the refractive doublets and large $SS_2$. The effective $y_2$ for use in Eq. (3) is given by the projection of the marginal ray to the principle plane in collimated space between doublets B and C. Therefore, the physical lens diameter can be smaller than the effective diameter used for color correction.

Figure 8:
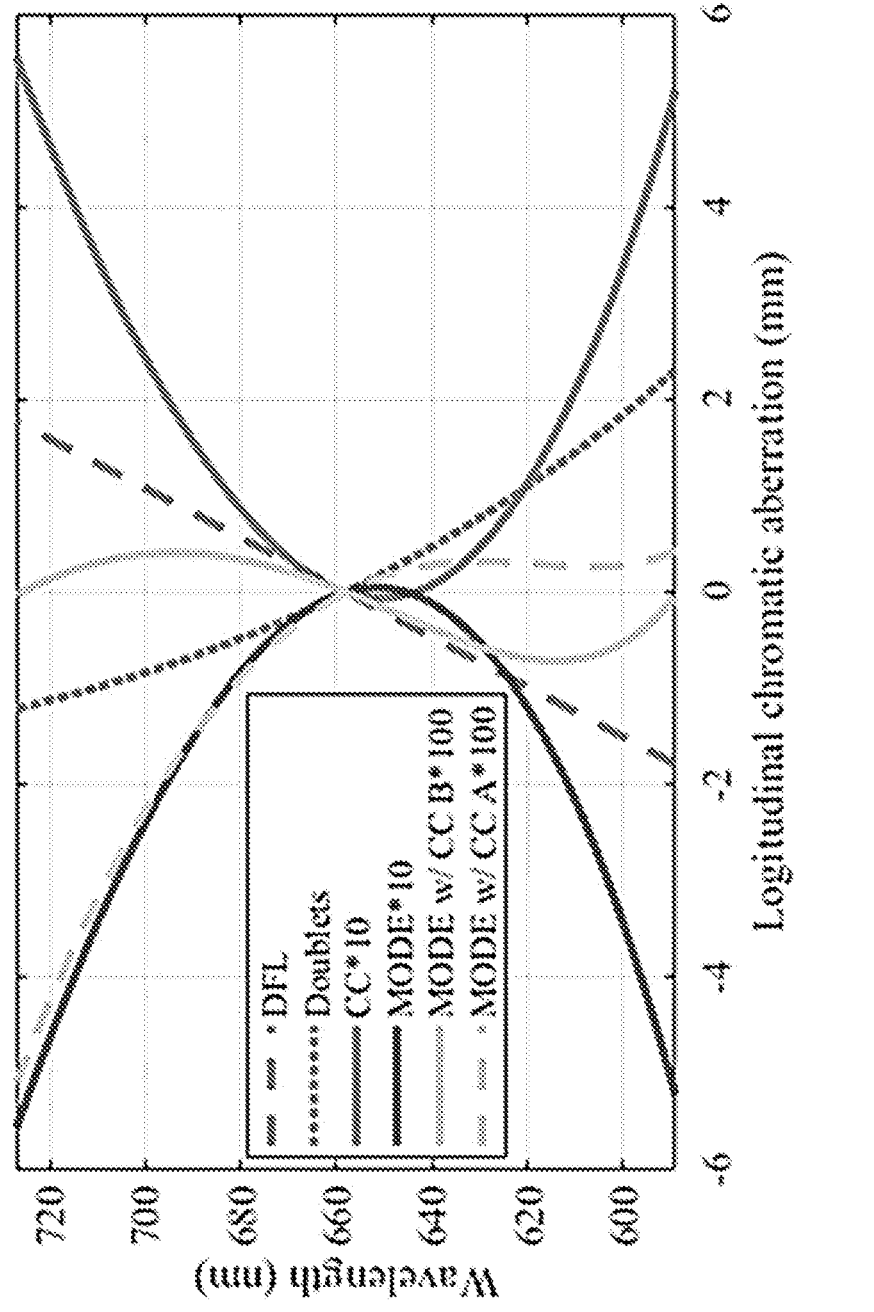
FIG. 8 is a plot of wavelength vs. LCA, where large refractive dispersion of the color corrector doublets is shown as a red dotted curve, and DFL dispersion is shown as a red dashed line; all LCA values are evaluated in zone 1 of the MODE primary and color corrector; smaller LCA values are scaled up to 10× or 100× for presentation purposes.

These concepts are displayed graphically in FIG. 8, which is a plot of wavelength vs. LCA, where large refractive dispersion of the color corrector doublets is shown as a red dotted curve, and DFL dispersion is shown as a red dashed line. All LCA values are evaluated in zone 1 of the MODE primary and color corrector. Smaller LCA values are scaled up to 10× or 100× for presentation purposes. The combination of these two Type 1 LCA functions results in the achromatic LCA form of the color corrector, which is shown as a solid red curve and compensates the opposite LCA curve of the MODE primary lens that is shown as a blue solid line. The result is an apochromatic Type 1 LCA design. Results from two color corrector designs, which are labeled as Design A and Design B, are illustrated with dashed green and solid green lines, respectively. These designs are discussed below in more detail. Because the power and dispersion of each MODE zone are slightly different, the DFL in the color corrector is optimized for each zone, which is possible because the image of the primary is near the DFL in collimated space. Note that all the Type 1 LCA curves of FIG. 8 are evaluated at zone 1. The chromatic performance of the remaining four zones are similar to zone 1.

Although there are some similarities with the Schupmann design, like the existence of a field lens, the configuration shown in FIG. 7 is distinctly different. Where the Schupmann configuration uses a negative-power element with the same dispersion as the primary, the new design uses a combination of refractive and diffractive components to affect a secondary spectrum that cancels with the secondary spectrum of the primary.

As the focal length of the primary MODE lens increases, $SS_1$ also increases. $SS_1$ due to a lens made from BK7-like glass, such as L-BSL7, with an Abbe number of 64.1 combined with a long focal length HOE/DFL on one surface is about 0.6% of the focal length over the visible spectrum. $SS_1$ for the design example over the astronomical R-Band is about 0.55% of the focal length, or 550 μm. If the focal length of the MODE primary lens increases by a factor of 10, $SS_1$ increases to about 6 mm. A less dispersive low-temperature glass used for the MODE primary, like N-PK51 with an Abbe number of 76.98, will produce smaller $SS_1$. For example, an N-PK51 glass MODE primary with a 1 m focal length would produce $SS_1$=478 μm, which is a reduction in magnitude of 72 μm from the current L-BSL7 design.

As $SS_1$ increases, the color corrector must be modified to provide for high-quality imaging. Although $f_2$ could be increased, it is not a desirable option, due to the increased diameter of the color corrector. Instead, both the refractive dispersion of the color corrector and the DFL dispersion must increase. At some point, the divergence of the DFL will force the solution to use asymmetric doublet designs on both sides of the DFL, with the addition of more low-optical power doublets to increase the refractive dispersion and aspherics on the higher-power surfaces. In addition, as the diameter of the MODE primary increases, the marginal ray height $y_2$ must also increase for a fixed $f_2$. To keep the same corrector lens diameter, $f_2$ must decrease, again forcing an increase in $SS_2$. Also, as the f-number of the primary lens increases, the f-number of the color corrector must also increase.

2.2 Type 2 LCA

Figure 9:
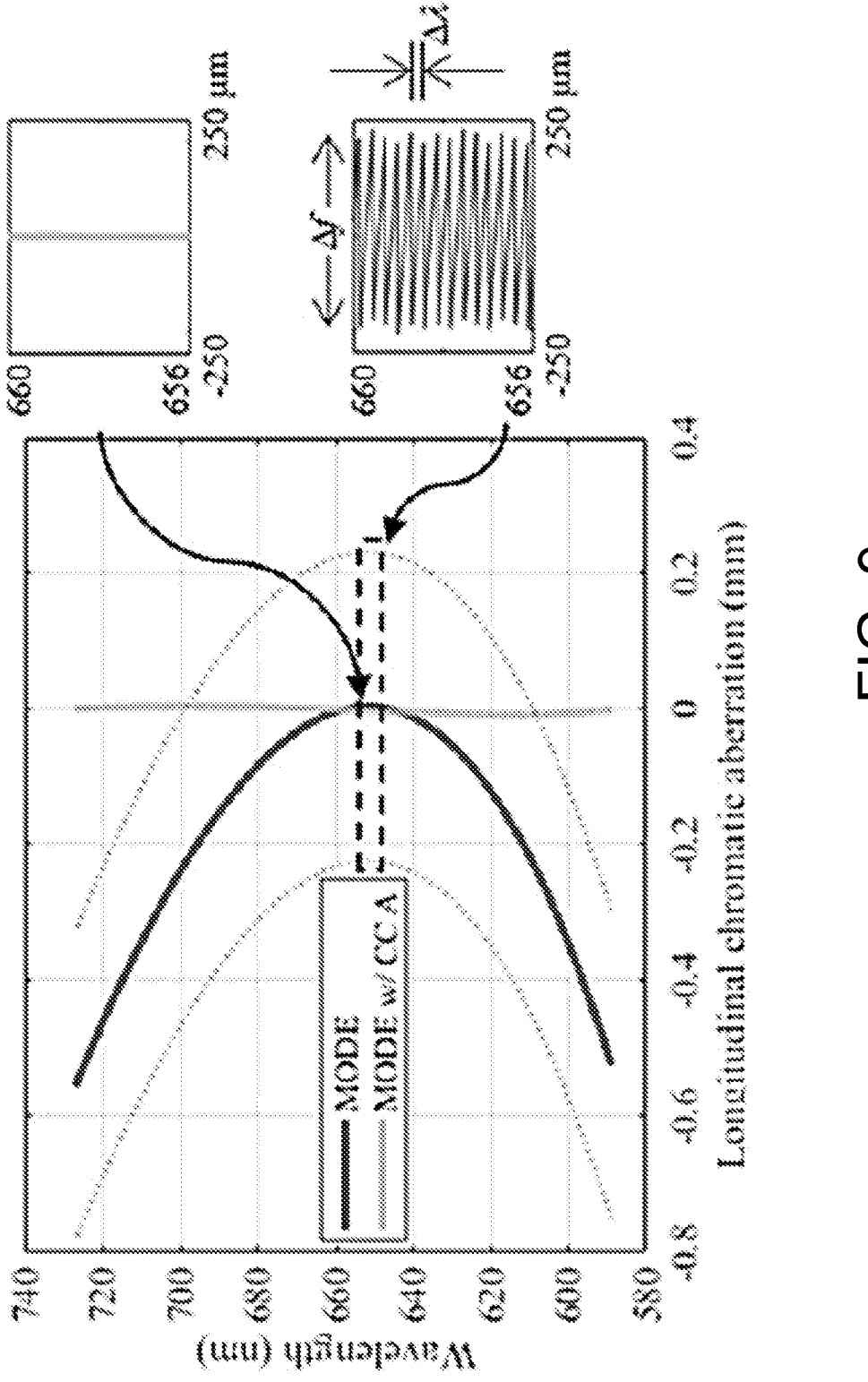
FIG. 9 is an LCA plot of the MODE lens with the Design A color corrector, including the AZTECC lens, before (blue line) and after (green line) color correction, showing that the step profile produces a variation in focus of the MODE primary lens.

Type 2 LCA is due to the abrupt Mh change in surface height on the MOD surface, as shown in FIG. 1, which produces a discrete jump in OPD at the transition points. This change results in a step profile of OPD versus radius for any wavelength, in addition to any focus or aberrational functional dependence. The step profile produces a variation in focus of the MODE primary lens, as shown in FIG. 9, which is an LCA plot of the MODE lens with the Design A color corrector, including the AZTECC lens, before (blue line) and after (green line) color correction. The color-corrected result shows more than 10 times less Type 1 LCA and almost no Type 2 LCA compared to before correction. This figure shows LCA including all zones of the system. FIG. 9 shows that there is a cyclic variation in focus with period $\Delta f = f_0/M$ around the design wavelength of 658 nm. Dashed lines indicate the boundary of the Type 2 $\Delta f$ variation, and the solid blue line is $SS_1$ of Type 1 LCA. The solid green line is the total LCA after correction with the Design A color corrector and AZTECC lens. There are no dashed-line boundaries associated with the solid green line, because the residual Type 2 LCA after full correction is less than a few micrometers.

The solution for Type 2 LCA used to calculate FIG. 9 is to compensate OPD jumps between zones with flat plates in the collimated section of the color corrector, which are close to the image of the primary lens. For example, the zonal transition between the first and second zone results in an abrupt change of OPD by M waves. In the color corrector, a Type 2 LCA corrector plate in the collimated space is designed with zone 1 thicker than zone 2, so the light transmitting through zone 1 obtains an additional M wavelengths of OPD. In the example MODE primary lens design, M=2196 that corresponds to an L-BSL7 glass thickness change at each zone boundary of Mh=2.812 mm at the 658 nm wavelength. Because it uses the same glass as the primary, OPDs of all wavelengths are compensated, which solves the Type 2 LCA problem.

FIG. 10A shows the generation and compensation of abrupt OPD changes between MODE zones. Optical elements between the MODE primary lens and the AZTECC Type 2 LCA corrector, as well as elements after the AZTECC, are not presented for the sake of simplicity. FIG. 10B shows a CAD model of the AZTECC element used in the MODE system. As shown in FIGS. 10A and 10B, OPD between MODE zones is caused by both front and back surfaces in the design example, where transition heights between the two zones are $t_1$ and $t_2$, respectively. OPDs between each zone for all wavelengths are $$OPD = (t_1 + t_2)[n_{MODE}(\lambda) - 1] - t_3 n_{AZTECC}(\lambda). \qquad (2)$$

If the AZTECC uses the same type of glass as the MODE primary lens, the OPD is compensated for all wavelengths with $$t_3 = t_1 + t_2. \qquad (3)$$

Figure 11:
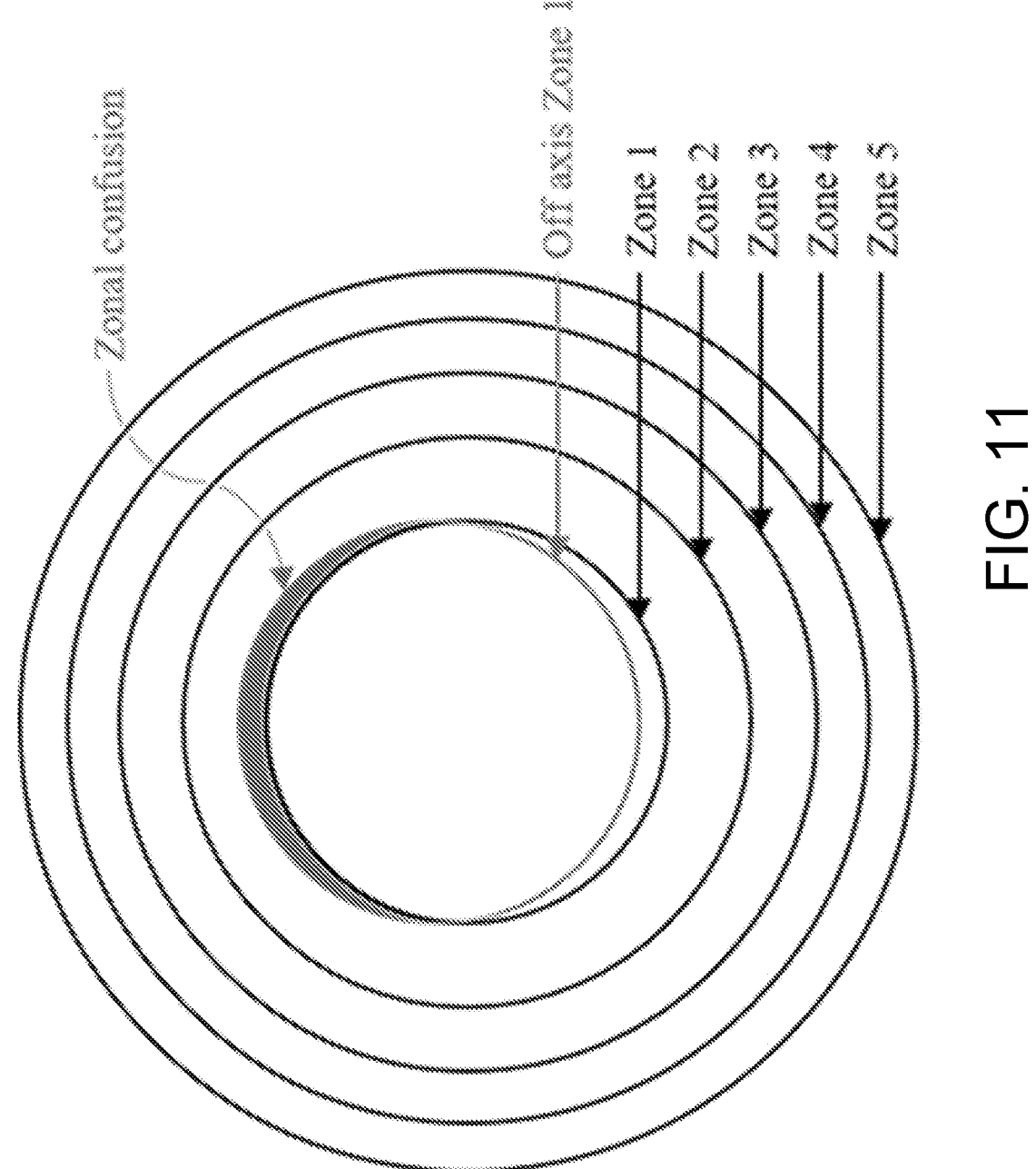
FIG. 11 is a simplified illustration of the formation of zonal confusion, simplified to show zonal confusion for only one field angle of one zone; on-axis fields intercept the AZTECC perpendicularly, which results in correct OPD compensation for all zones (black); off-axis fields have oblique incidence to the AZTECC and may enter undesirable zones, which results in undesired OPD values (blue); off-axis fields (blue) near the edge of zones can intercept other zones, which cause undesired OPD variation.

A limitation to the AZTECC Type 2 LCA corrector is due to the field angle in object space. In the design example, doublets A and B collimate finite-conjugate fields from the field lens. The collimated on-axis field is parallel to the optical axis. If aligned well, light from the MODE primary lens zones is mapped to AZTECC zones with good registration. However, as illustrated in FIG. 11, off-axis fields (blue) near the edge of zones can intercept other zones, which cause undesired OPD variation. This effect is defined as zonal confusion. Since the field of view is rotationally symmetric, the area with zonal confusion is a ring near the zone transitions. In the design example, zonal confusion is only at 2.5% of the total pupil area. In order to eliminate effects of zonal confusion, transitions between MOD zones in the primary are slanted to direct light that might cause zonal confusion away from the color corrector, and these rays are blocked by absorbing surfaces inside the telescope. FIG. 11 is a simplified illustration of the formation of zonal confusion. This illustration is simplified to show zonal confusion for only one field angle of one zone. On-axis fields intercept the AZTECC perpendicularly, which results in correct OPD compensation for all zones (black). Off-axis fields have oblique incidence to the AZTECC and may enter undesirable zones, which results in undesired OPD values (blue). Off-axis fields (blue) near the edge of zones can intercept other zones, which cause undesired OPD variation. This effect is defined herein as zonal confusion. Since the field of view is rotationally symmetric, the area with zonal confusion is a ring near the zone transitions. In the design example, zonal confusion is only at 2.5% of the total pupil area. In order to eliminate effects of zonal confusion, transitions between MOD zones in the primary are slanted to direct light that might cause zonal confusion away from the color corrector, and these rays are blocked by absorbing surfaces inside the telescope.

3. Design Example

Figures 12A, 12B, 12C, 12D:
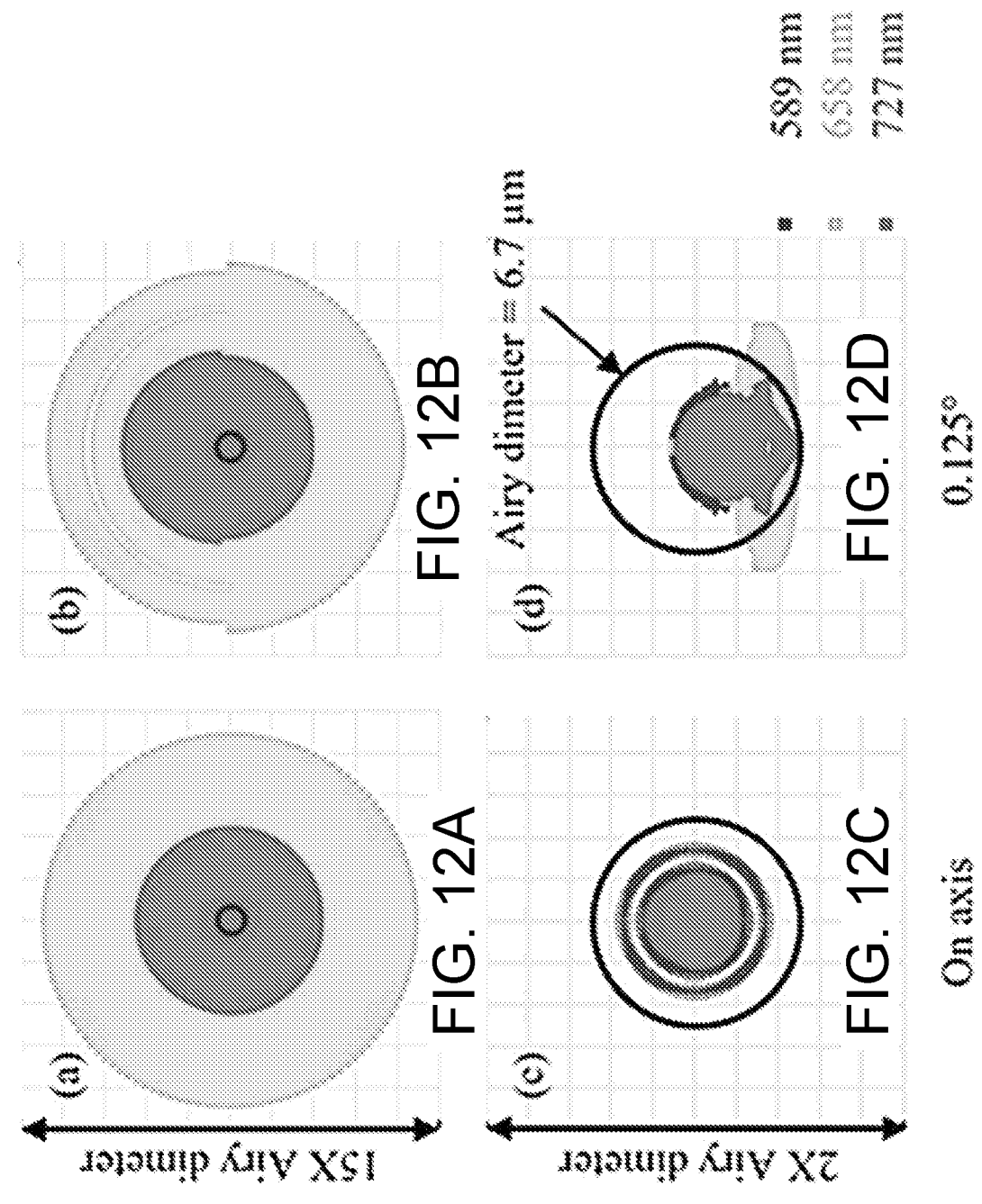
FIGS. 12A-12D are spot diagrams of the MODE telescope with and without color corrector design A at three wavelengths in the astronomical R-band.

This section presents both raytracing and physical optics modeling of the MODE telescope system with the Design A color corrector. The MODE primary lens design is used for the analysis in all cases. This MODE primary lens design is a spherical-front shape, which results in low off-axis aberration. During Zemax® optimization, the color-corrector DFL is modeled as a Sweatt surface, as shown in Table 1 (FIG. 6), which calculates the OPD as a function of aperture. When the condition of Eq. (3) is satisfied, an apochromatic system is produced, as shown in the CC Design B green curve in FIG. 8, which illustrates total Type 1 LCA. Compared to Type 1 LCA of the MODE primary, the total LCA is a factor of 560.8/11.2~50× smaller. Type 2 LCA is assumed to be compensated by the AZTECC lens. However, a slightly different solution, CC Design A, was found by allowing slightly more Type 1 LCA and produced slightly better root-mean-square (rms) spot size, as will now be described with reference to FIGS. 12A-12D. FIGS. 12A-12D are spot diagrams of the MODE telescope with and without color corrector Design A at three wavelengths in the astronomical R-band; FIG. 12A is a spot diagram for the MODE primary lens only, on-axis; FIG. 12B is a spot diagram for the MODE primary lens only, full field; FIG. 12C is a spot diagram for the MODE primary lens with color corrector, on axis; and FIG. 12d is a spot diagram for the MODE primary lens with color corrector, full field; FIGS. 12A and 12B show near diffraction limited spot diagrams.

The overall geometrical performance of the system includes not only chromatic aberration, but also monochromatic aberrations such as astigmatism and coma, which are characteristic for off-axis field angles. The uncorrected system spot diagrams in FIGS. 12A and 12B are nearly 15× the Airy spot diameter at 658 nm of 6.7 μm. There is an insignificant effect due to non-zero field angle in FIG. 12B. The corrected system spot diagrams shown in FIGS. 12C and 12D display ray intercepts well within the Airy spot diameter for most rays, with a slight increase in diameter at the full filed angle of 0.125°. FIGS. 12C and 12D indicate that the corrected system is diffraction limited in the geometrical sense.

Design with raytracing in Zemax® results in a color-corrected system with the consideration of refractive aberrations including coma, spherical aberration, astigmatism, and Type 1 LCA, but not diffractive properties. A full model of the MODE system requires diffractive analysis that includes calculation of Fresnel propagation of field amplitudes using Hankel transforms from optical path lengths (OPLs) across the exit pupil. The OPLs of multiple wavelengths are calculated by raytracing, which is performed by customized macro in Code V® raytracing software after converting the Zemax sequential model to a Code V® non-sequential model. Then, the optical phase in the exit pupil is calculated with 1000 sample points across the pupil, and Fresnel propagation using a Hankel transform is used to calculate field amplitude of the point-spread-function (PSF) versus focal-plane distance and radius for each wavelength. PSF irradiance is calculated by the magnitude squared of the field amplitude. PSF profiles, encircled energy, Strehl ratio, and modulation transfer function (MTF) properties are calculated from the polychromatic PSF data. 10000 samples points in the radial direction at each focal plane location are used in order to obtain sufficient range and resolution for the MIT calculation.

It is sufficient to test five wavelengths across the astronomical R-Band for the slowly varying Type 1 LCA, which are 589 nm, 623 nm, 658 nm, 692 nm and 727 nm. Around each test wavelength, a small band of finely sampled wavelengths is used to evaluate Type 2 LCA. Since Δf~0.3 nm in the design example, the PSF is evaluated in a 0.3 nm range near each test wavelength with a wavelength increment of 0.05 nm. This wavelength sampling produces polychromatic PSF data from a total of 35 wavelengths.

Figures 13A, 13B, 13C:
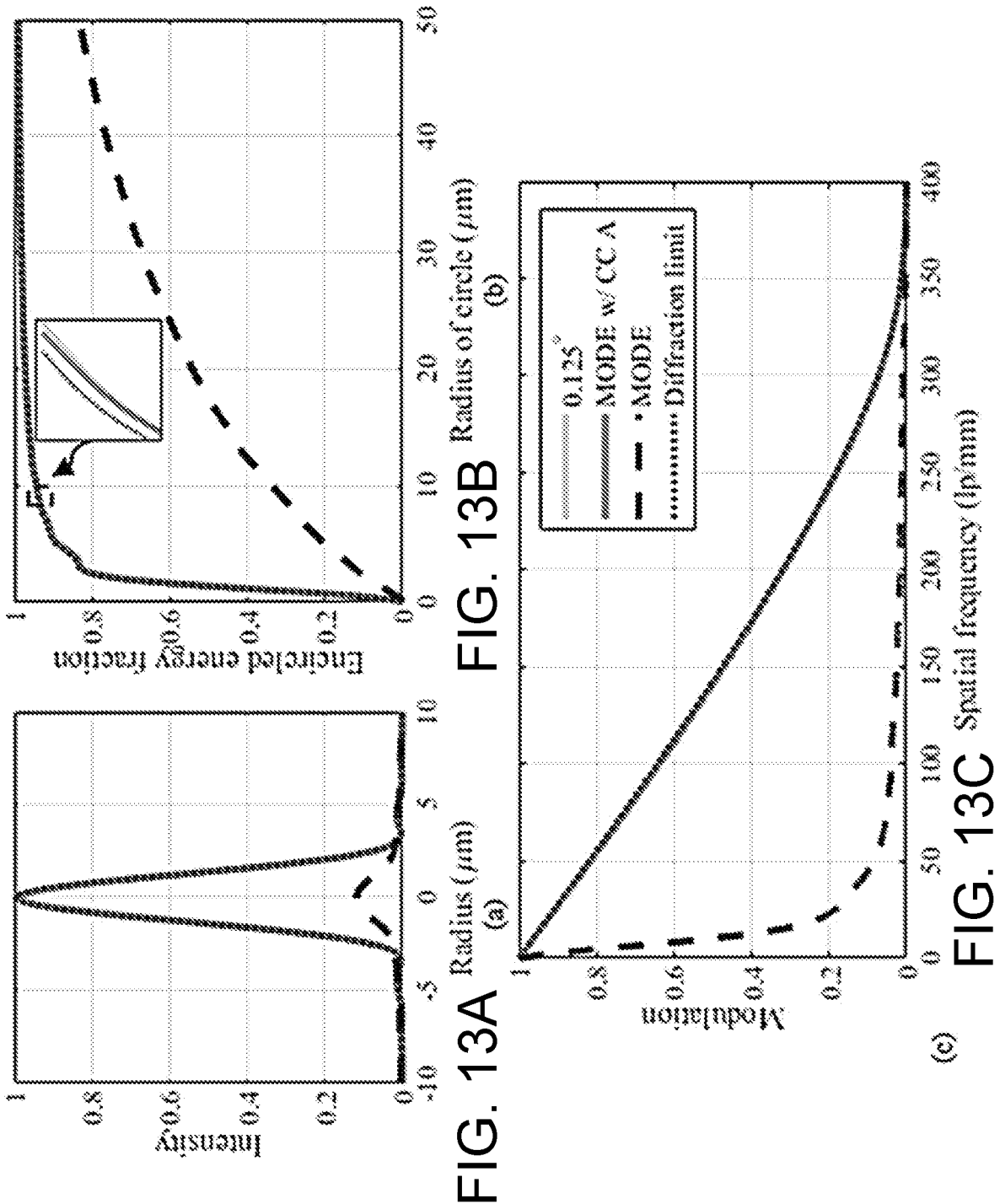
FIG. 13A shows plots of the polychromatic PSFs of the MODE telescope system before correction and after correction both on and off axis, and the diffraction limit ideal case, across the astronomical R-band as calculated with the physical optics model.
FIG. 13B is a plot of the corresponding encircled energy. The encircled energy is calculated by integrating the PSFs as a function of radius.
FIG. 13C are plots of the polychromatic modulation transfer functions (MTFs), based on the PSFs shown in FIG. 13A, of the MODE telescope before and after correction, with the corrected system displaying diffraction-limited performance.

FIG. 13A shows plots of the polychromatic PSFs of the MODE telescope system before correction and after correction both on and off axis, and the diffraction limit ideal case, across the astronomical R-band as calculated with the physical optics model. FIG. 13B is a plot of the corresponding encircled energy. The encircled energy is calculated by integrating the PSFs as a function of radius. FIG. 13C are plots of the polychromatic modulation transfer functions (MTFs), based on the PSFs shown in FIG. 13A, of the MODE telescope before and after correction, with the corrected system displaying diffraction-limited performance.

In FIG. 13A, spot irradiance profiles are shown normalized to the ideal polychromatic PSF with no aberrations, including Type 1 and Type 2 LCAs. The linear irradiance scale shows an indistinguishable difference between the polychromatic PSFs of the ideal system and both on-axis and off-axis color-corrected MODE systems, with Strehl ratios ~0.99 for both on axis and maximum field of view. The MODE primary without color correction (MODE) exhibits a Strehl ratio of about 0.12. As with the PSF profiles, the encircled energy plots in FIG. 13B are nearly perfect for the corrected system, both on and off axis.

4. Discussion

Development of color correcting systems for high-harmonic diffractive lenses is motivated by a recently introduced concept for constructing an array of large-aperture space telescopes for exoplanet transit studies [1]. The long-range goal is to realize 8.5 m diameter apertures on each telescope in the array. The results presented here provide methodologies for optical systems with harmonic diffractive lenses, and a preliminary design for further study. Prototypes of both the color corrector and the corresponding primary MODE lens are being fabricated and tested, in order to verify the theories presented here. Results on tolerancing, fabrication, alignment and imaging will be discussed in future works.

The mass of a scaled color corrector reported here is too large for the space telescope application if the MODE primary is 8.5 m diameter. However, lightweight color corrector design can be achieved while maintaining near diffraction limit performance by using aspherical surfaces on the doublets, as well as using a DFL with more optical power. Design experiments show that the mass of the color corrector can be reduced at least a factor of four in comparison with the current design, making it much lighter. We have found that the color corrector diameter does not scale directly with the diameter of the primary MODE lens. In fact, the diameter of lightweight designs is typically a factor of two or more smaller than the current design. In addition, color correction methods described in Section 3 are robust over broader spectra that the astronomical R-Band, so the color corrected wavelength range could be expanded with minor adjustments to the optical system.

CONCLUSIONS

In conclusion, a new type of color correcting solution is described for reducing unique dispersion characteristics of high-harmonic diffractive lenses, which are a combination of refractive (Type 1) and diffractive (Type 2) dispersion. Design examples with practical consideration are presented with both raytracing and a physical simulation model. The resulting design successfully reduces dispersion from an existing harmonic diffractive lens and results in diffraction limited performance over the astronomical R-band and 0.25° full field of view.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A device for correcting longitudinal chromatic aberration (LCA) in high-harmonic diffractive lenses, the device comprising:

a multi-order diffractive engineered surface (MODE) lens comprising, a MODE primary lens; and a color corrector, wherein polychromatic light is incident on and passes through the MODE primary lens before being incident on and passing through the color corrector, and the polychromatic light passing through the MODE primary lens experiences LCA that is corrected by the color corrector, where the color corrector comprises:

a field lens disposed at or near a focal point associated with an effective focal length (EFL) of the MODE primary lens, the field lens being optically aligned with the MODE primary lens; and an Arizona total energy color corrector (AZTECC) lens optically aligned with the field lens and the MODE primary lens, where the field lens is configured to produce an image of the MODE lens near a location of the AZTECC lens, and the AZTECC lens comprises plate zones of glass that provide an optical path difference that compensates the LCA experienced by the polychromatic light passing through the MODE primary lens.

2. The device of claim 1, wherein the MODE primary lens comprises a curved front surface having an M-order diffractive pattern formed therein that extends from a center of the MODE primary lens to a periphery of the MODE primary lens, where M is a positive integer that is greater than or equal to 250, the M-order diffractive pattern segmenting the MODE primary lens into N MOD zones, each MOD zone being separated from an adjacent multi-order diffractive (MOD) zone by a transition in the curved front surface having a preselected transition height.

3. The device of claim 1, wherein the color corrector comprises a diffractive Fresnel lens (DFL), the field lens being optically aligned with the MODE primary lens and with the DFL.

4. The device of claim 3, wherein the color corrector further comprises:

a doublet relay lens optically aligned with the field lens and with the DFL; and the AZTECC lens optically aligned with the doublet relay lens and the DFL.

5. The device of claim 4, wherein the doublet relay lens comprises a first pair of doublets A and B and a second pair of doublets C and D, the first pair of doublets A and B being disposed in between the field lens and the AZTECC lens, the second pair of doublets C and D being disposed in between the DFL and an output of the color corrector, the DFL being disposed in between the AZTECC lens and the second pair of doublets C and D, the AZTECC lens being disposed in between the first pair of doublets A and B and the DFL.

6. The device of claim 5, wherein the first pair of doublets A and B collimate light coupled by the field lens onto the first pair of doublets and couple a collimated light beam onto the AZTECC lens, and wherein the second pair of doublets refocus the collimated light beam passing through the AZTECC lens and the DFL.

7. The device of claim 6, wherein the color corrector corrects for Type 1 LCA and Type 2 LCA, Type 1 LCA being LCA resulting from a combined effect of a refractive index change versus wavelength associated with material comprising the device and the DFL producing a change in focus of the polychromatic light, Type 2 LCA being LCA resulting from a cyclic variation in focal length versus wavelength resulting from abrupt changes in height of a front surface of the MODE primary lens due to transitions.

8. The device of claim 7, wherein the AZTECC lens comprises a Type 2 LCA corrector plate having multiple plate zones with multiple respective thicknesses such that each plate zone produces a preselected number of wavelengths of optical path difference (OPD) as the collimated light passes through the AZTECC lens.

9. A method for correcting longitudinal chromatic aberration (LCA) in high-harmonic diffractive lenses, comprising:

receiving polychromatic light incident on a multi-order diffractive engineered surface (MODE) primary lens, where the polychromatic light passing through the MODE primary lens experiences LCA before emission; and receiving the emitted polychromatic light incident on a color corrector, where the color corrector corrects the LCA before emission, where the color corrector comprises:

a field lens disposed at or near a focal point associated with an effective focal length (EFL) of the MODE primary lens, the field lens being optically aligned with the MODE primary lens; and an Arizona total energy color corrector (AZTECC) lens optically aligned with the field lens and the MODE primary lens, where the field lens is configured to produce an image of the MODE lens near a location of the AZTECC lens, and the AZTECC lens comprises plate zones of glass that provide an optical path difference that compensates the LCA experienced by the polychromatic light passing through the MODE primary lens.

10. The method of claim 9, comprising directing the polychromatic light onto the MODE primary lens.

11. The method of claim 9, wherein the MODE primary lens comprises a curved front surface having an M-order diffractive pattern formed therein that extends from a center of the MODE primary lens to a periphery of the MODE primary lens, where M is a positive integer that is greater than or equal to 250, the M-order diffractive pattern segmenting the MODE primary lens into N multi-order diffractive (MOD) zones, each MOD zone being separated from an adjacent MOD zone by a transition in the curved front surface having a preselected transition height.

12. The method of claim 9, wherein the color corrector comprises a diffractive Fresnel lens (DFL).

13. The method of claim 12, wherein the field lens is optically aligned with the MODE primary lens and with the DFL.

14. The method of claim 13, comprising collimating light coupled by the field lens onto a pair of doublets A and B of the color corrector to produce a collimated light beam, the collimated light beam coupled onto the AZTECC lens.

15. The method of claim 14, wherein the color corrector comprises a doublet relay lens comprising the pair of doublets A and B, the doublet relay lens A and B optically aligned with the field lens and with the DFL, and the AZTECC lens optically aligned with the doublet relay lens and the DFL.

16. The method of claim 15, wherein the doublet relay lens comprises another pair of doublets C and D, the pair of doublets A and B being disposed in between the field lens and the AZTECC lens, the other pair of doublets C and D being disposed in between the DFL and an output of the color corrector, the DFL being disposed in between the AZTECC lens and the second pair of doublets C and D, the AZTECC lens being disposed in between the first pair of doublets A and B and the DFL.

17. The method of claim 16, wherein the other pair of doublets C and D refocus the collimated light beam passing through the AZTECC lens and the DFL.

18. The method of claim 14, wherein the AZTECC lens comprises a Type 2 LCA corrector plate having multiple plate zones with multiple respective thicknesses such that each plate zone produces a preselected number of wavelengths of optical path difference (OPD) as the collimated light passes through the AZTECC lens.

19. The method of claim 13, wherein the color corrector corrects for Type 1 LCA and Type 2 LCA, Type 1 LCA being LCA resulting from a combined effect of a refractive index change versus wavelength associated with material comprising the device and the DFL producing a change in focus of the polychromatic light, Type 2 LCA being LCA resulting from a cyclic variation in focal length versus wavelength resulting from abrupt changes in height of a front surface of the MODE primary lens due to transitions.

* * * * *